United States Patent Office 3,804,954
Patented Apr. 16, 1974

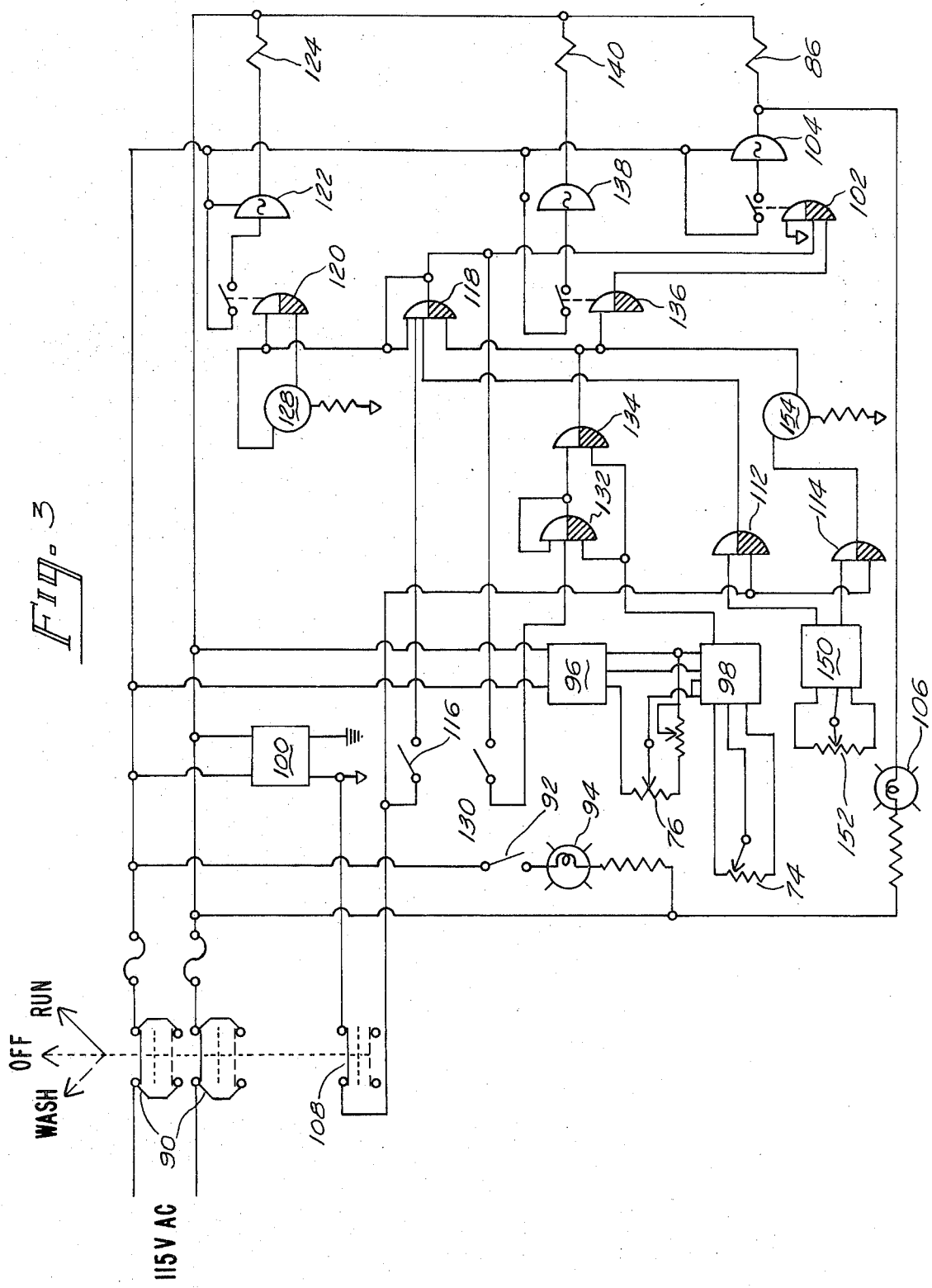

3,804,954
METHOD FOR DISPENSING MEASURED QUANTITIES OF LIQUID INTO A FOOD ITEM
Leroy Clardy, Naperville, Ill., assignor to
Swift & Company, Chicago, Ill.
Filed Apr. 14, 1972, Ser. No. 244,000
Int. Cl. A22c 18/00
U.S. Cl. 426—230
3 Claims

ABSTRACT OF THE DISCLOSURE

Specific quantities of liquid additive material for injection into a food item are delivered by filling a metering means only with an amount of such material measured as a percentage of the weight of the item, and the entire quantity is emptied from said metering means to said item.

SPECIFICATION

This invention relates to the food processing art and, more particularly, it is an improved method and apparatus for providing measured quantities of liquid materials for injection into a food item, especially a meat item.

The present invention is an improvement upon the method and apparatus disclosed in U.S. Pat. No. 3,556,808 to Mitchell W. Panek. In that patent a method and an apparatus for proportioning and metering a liquid additive and injecting same into a food item such as a poultry carcass, were disclosed. Provision was made to inject an amount selected by an operator in accordance with the weight of the item to be injected. According to that apparatus and method the pistons of a plurality of measuring cylinders were withdrawn simultaneously to completely fill the cylinders and when the carcass was ready for injection the pistons were driven forwardly, in unison, and stopped when the forward stroke had proceeded a distance sufficient to expel the quantity of liquid selected by an operator.

As a result the prior method and apparatus is subject to considerable human error. If the operator incorrectly reads the weighing scale an inappropriate amount of liquid additive will be selected. Even if the scale is properly read, the operator may err in setting the control for the measuring cylinders. Also, it is possible that the control may be overridden and a quantity of liquid in excess of that selected may be expelled on the forward stroke of the pistons.

In an operation such as that accuracy is extremely important as government regulations prescribe the maximum percentage of liquid additive that may be injected into an item, yet there is no practical way of double-checking the item of product after the liquid is injected therein. Accordingly, to maintain high quality control, it has been necessary to utilize highly skilled and extremely careful operators and to periodically spot check product by weighing and recording weights of carcasses, both before and after injection.

Accordingly, it is a principal object of the present invention to provide an improved accuracy control on a method and apparatus for delivering measured proportions of liquid to be injected into a food item.

Another object of the present invention is to provide an improved apparatus for delivering measured quantities of liquid for injection, wherein such quantities are automatically determined by a scale upon which the item is first weighed.

It is still another object of the present invention to provide an improved apparatus for delivering measured quantities of liquid to be injected into a food item whereby a metering means has a locking means that prevents the dispensing of any excess quantity of liquid.

It is yet another object of the present invention to provide an improved method for delivering measured quantities of liquid for injection into a food item wherein a metering means is partially filled only sufficiently to provide the measured quantity and is then completely discharged to deliver that quantity of liquid.

The present method comprises the measuring of a specific quantity of liquid additive while filling into a metering means, and terminating the filling of said metering means when the selected quantity has been charged thereto. The method also includes the locking of the filled metering means against change of volume of liquid until after the first specific quantity has been completely expelled therefrom. At no time is the metering means filled with any quantity of liquid greater than the measured amount selected to be injected into a particular item.

An apparatus for performing this method basically comprises one or more metering means (preferably measuring cylinders and associated reciprocable pistons), control means connected between same and a scale for weighing the item to be injected, and locking means connected to prevent relative movement of said metering means after the measured quantity is filled therein and before it is expelled therefrom.

Further objects and advantages of the present invention will become apparent upon reading the following detailed description in conjunction with the drawings wherein:

FIG. 3 is a schematic diagram of a preferred electrical control system for the apparatus of FIG. 1.

According to the prior art the measuring and dispensing cylinder was completely filled to maximum capacity prior to each injection operation. As a matter of convenience once an injection was carried out and a certain quantity of liquid expelled from the cylinder, it would immediately and automatically be refilled to the maximum level. Thereafter, an operator manually prescribed the distance of movement of a piston which thereby regulated the volume of liquid that could next be expelled. That specified volume was then injected into the next item by causing a piston to move forwardly in the measuring cylinder until it had reached the selected distance. Thus, it was possible to move the piston an additional further distance by accidental displacement of the control before the selected injection had been completed.

According to the present process a metering means is filled only with the measured quantity of additive, which is subsequently fully expelled. The filling and dispensing strokes have been altered so that the measuring-dispensing cylinder is maintained in an empty condition until the desired quantity of liquid additive has been determined. At that point the stroke of the dispensing piston sufficient to provide the selected amount of liquid is determined and the piston is withdrawn only that distance. The measuring-dispensing cylinder is thus filled only with the amount of liquid determined to be appropriate for injection.

When filled with the selected quantity of additive, the metering means is arrested and locked against further filling. Specifically, in this condition the piston and cylinder are locked against further relative movement that would allow for further filling or premature discharge. Only a command to expel liquid from the cylinder can override the lock. Thereafter the item is ready for injection and is connected to the metering means, with injection needles and tubing, etc., and unlocked; and the metering means is then emptied. That is, the piston is moved forwardly to the end of its discharge stroke so as to expel the entire quantity of liquid previously filled therein. The piston and cylinder are then maintained in the expelled-empty condition until the quantity of liquid for the next item to be injected has been determined.

In the latter regard, the present method also differs from that previously devised in that the desired quantity of liquid is determined directly at the weighing station and the information is fed directly to control the metering means. Preferably this is accomplished electrically by providing a drive potentiometer on the scale mechanism and a comparison potentiometer associated with the dispensing piston and moving the latter mechanism until the comparison potentiometer balances the signal from the drive potentiometer. Full details of the present method will be disclosed with the description of the apparatus and its operation.

Figure 1:
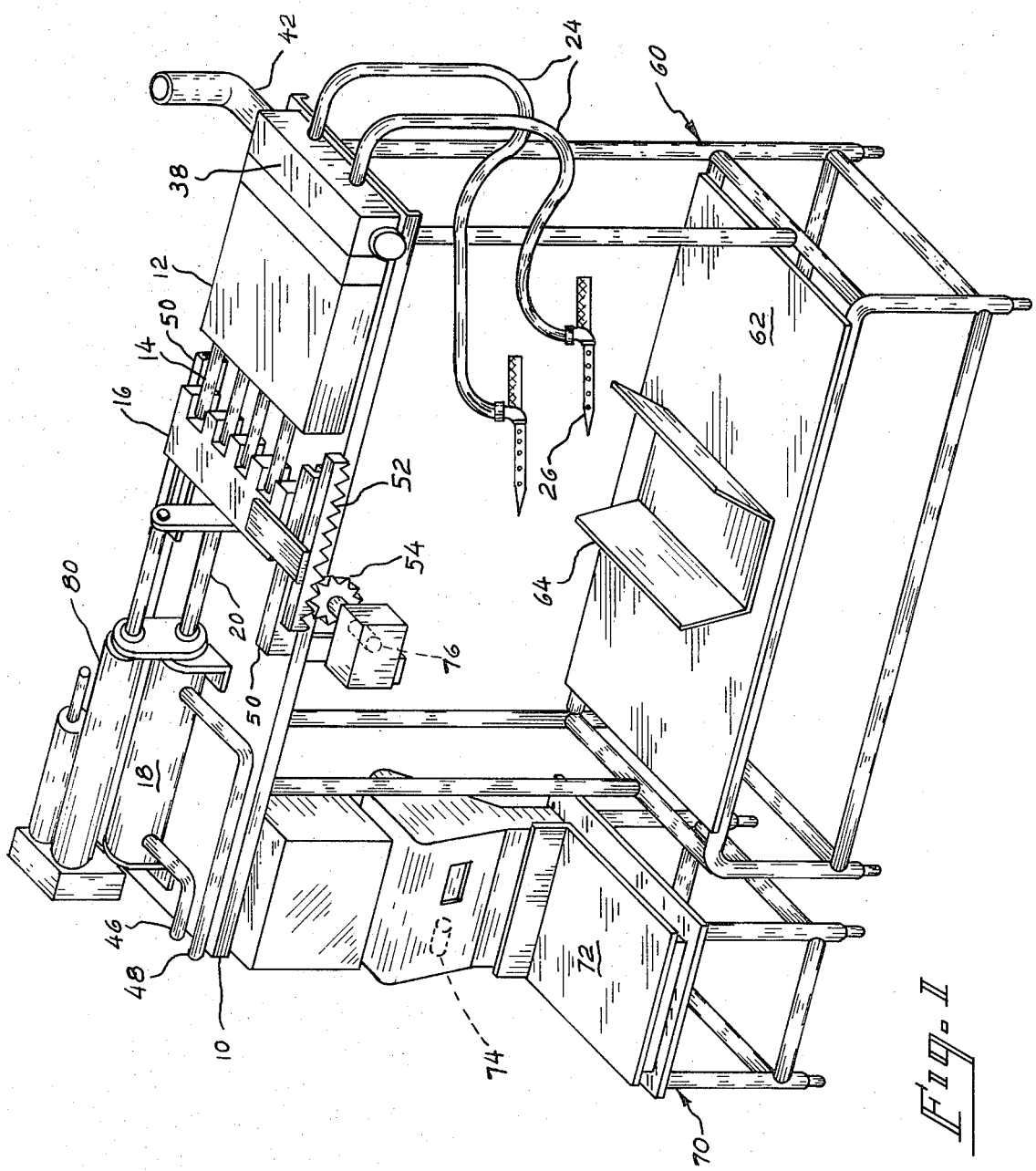
FIG. 1 is an overall perspective view of a preferred embodiment of the apparatus of the present invention.
Figure 2:
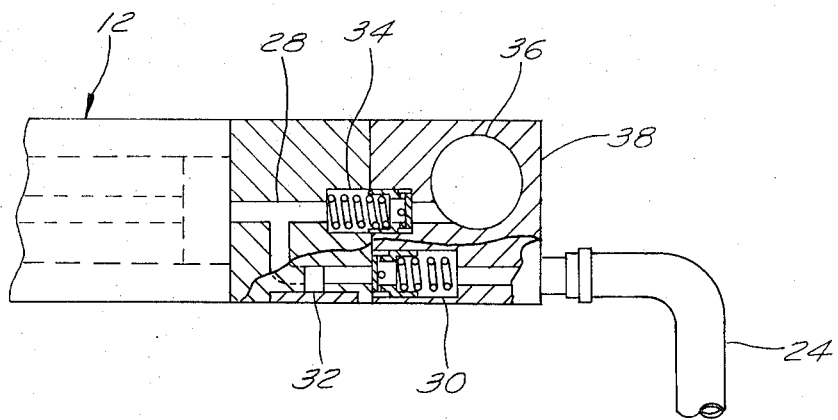
FIG. 2 is a detailed view of a portion of the apparatus of FIG. 1.

FIGS. 1 through 3 illustrate a preferred embodiment of the apparatus of this invention. A metering means is mounted in an overhead position on a horizontal bed 10. The metering means comprises a plurality of measuring cylinders 12, each having individual dispersing pistons (not seen) with respective piston rods 14 extending to a common yoke 16. The yoke 16 is driven reciprocably by means of a power cylinder 18 and connecting drive rod 20. The number of cylinders 12 is highly variable and is dependent, in large part, on the number of sites at which it is desired to simultaneously inject a given item with a portion of the total quantity of liquid.

When the power cylinder 18 moves the yoke 16 forwardly, liquid within the measuring cylinders 12 will be expelled to one or more flexible delivery lines 24 and injection needles 26 through "T" connectors 28 as seen in FIG. 2. Each "T" connector for each cylinder is connected to empty into one or more collector manifolds 32, which in turn are connected to delivery lines 24 through check valves 30. Similarly, each "T" connector 28 includes a filling check valve 34 that is connected to a supply manifold 36. All of the "T" connectors 28 and the various check valves and manifolds are preferably machined in one or more blocks 38.

When the dispensing pistons are withdrawn in the measuring cylinders 12 check valves 34 will open to permit liquid to enter these cylinders from the supply manifold 36. In this condition the discharge check valves 30 will seat and close off the collector manifold 32 so that liquid will not be withdrawn from the delivery lines 24. Similarly, when the pistons are moved forwardly in cylinders 12 to expel the liquid therefrom, the discharge check valves 30 will open, allowing the fluid to pass through collector manifolds 32 into the delivery lines 24; while the filling check valves 34 will seat and prevent liquid from being returned to the supply manifold 36.

Preferably the supply manifold 36 is connected to a supply line 42 and a reservoir of liquid additive (not shown). A washing fluid, such as water, is also available through the supply line at the selection of the operator.

The metering means is operated by power cylinder 18 through a pair of fluid lines 46, 48 connected to the latter. Introduction of pressurized fluid to the rear of the power cylinder 18 through fluid line 46 causes extension of a drive rod 20 to advance the yoke 16, which results in the liquid additive being expelled from the plurality of measuring cylinders 12 through the collector manifolds 32 and delivery lines 24. When the power cylinder 18 is reversed by introducing pressurized fluid to the forward end through fluid line 48, the movement of the yoke 16 is reversed and the liquid additive will be drawn into the plurality of measuring cylinders 12 through the supply manifold 36. The yoke 16 is preferably slideably mounted in guideways 50 fastened to the bed 10 at each side of the path of the yoke. A rack 52 is connected to one side of the yoke 16 to move therewith; and a rotatable pinion 54 journaled in a flange on bed 10 is meshed therewith at a fixed position as a potentiometer drive to be subsequently explained.

The foregoing apparatus is mounted on the horizontal overhead bed 10 which is supported on the top of a frame generally 60. A work table 62 is supported on the same frame at a level below the bed 10, and has a cradle 64 fastened thereto so as to conveniently retain and support a poultry carcass for insertion of the injection needles 26 by an operator.

The structure of the apparatus described thus far is substantially in accordance with the prior art and, according to this invention, has been improved by the provision of a separate scale frame generally 70 upon which is mounted a weighing scale 72. The scale includes a drive potentiometer 74 attached to its inner mechanism so as to provide a variable voltage in proportion to the weight of a carcass placed upon the scale 72. A second or comparison potentiometer 76 is attached to be driven by the pinion 54. Both potentiometers 74 and 76 are connected to an electrical circuit which automatically controls operation of the power cylinder 18, whereby the metering means will be driven to fill and expel only the precise amount of additive required to increase the weight of the item scaled by a selected percentage.

The apparatus has been further improved by including a locking means generally 80 which is operable to prevent relative movement of the dispersing pistons in measuring cylinders 12. The locking means 80 is, accordingly, connected between the power cylinder 18 and the yoke 16. Preferably the locking device 80 is in the form of a "Hydrocheck" (a registered trademark) which is a commercially available device comprising a cylinder and piston having a solenoid valve 86 controlling the passage of fluid from one end of the cylinder to the other. The "Hydrocheck" cylinder may be fastened to the power cylinder 18, and the "Hydrocheck" piston may be fastened to either the yoke 16 or that end of the drive rod 20. When the "Hydrocheck" piston is moved the fluid from one side, in the direction of movement, is passed to the opposite end of the cylinder and if the solenoid valve 86 is closed the fluid will be blocked and the piston will be prevented from further movement. Thus, the locking device 80 is used to prevent movement of the yoke 16. A mechanical clamp, or the like, could also be used as the locking means.

The prior method and apparatus have been further improved by altering the way in which the dispensing cylinders 12 and their associated pistons are operated and devising a control means to govern the operation. Whereas, according to the prior art, the operating sequence was to completely fill the cylinders 12 and then expel a measured portion of the total charge; it has now been found to be desirable and more accurate to fill the cylinders 12 only with the measured quantity of additive required to be injected in an item, and then to expel the entire amount of the filled charge. Accordingly, an improved electrical control circuit, shown schematically in FIG. 3, automatically controls the sequence of operation of the foregoing apparatus. This circuit is comprised substantially entirely of solid state components and is fabricated from a plurality of standard modules (or subcircuits) that are available on the commercial market. In addition to certain power supply modules, the circuit includes the following:

1. OR modules (such as modules 112, 114, 118, 132 and 134 in FIG. 3) which produce an output signal when an input signal is applied (for example to the upper portion of the symbol) in the absence of an inhibiting signal (for example applied to the lower portion of the symbol)—any inhibiting signal is controlling and will prevent the production of an output signal.

2. Reed relay modules (such as modules 102, 120 and 136 shown in FIG. 3) which are similar to the OR modules and additionally include a switch that closes when an output signal is produced.

3. Static switch modules (such as modules 104, 122 and 138 shown in FIG. 3) which will pass alternating electrical current between two terminals only when a third gate trigger signal is completed to a third terminal.

4. Comparator modules (such as modules 98 and 150 shown in FIG. 3) which produce a single output signal from one of first and second terminal positions and the output automatically switches from one position to the other when a sensed voltage signal exceeds a reference signal.

The normal operating sequence of the apparatus and the structure and function of the control circuit may be followed with reference FIG. 3 wherein basic signal paths are shown (it being understood that each module is also connected to be powered from one of the direct current power supplies). A 3-position power switch 90, movable between Off, Wash and Run positions, is initially moved to the "Run" position to energize the circuit. Initially assume the yoke 16 is fully advanced so as to close a limit switch 92 and energize a first pilot light 94 signalling that the apparatus is in a "ready" condition. Closing of the power switch 90 also energizes a reference power supply 96, which is electrically connected to the second potentiometer 76 and supplies a DC voltage thereto. In the initial condition the second potentiometer 76 is at minimum resistance and provides an empty condition voltage on a first comparator module 98. The comparator module 98 is also connected to the reference power supply 96; and to the drive potentiometer 74 on the scale 72. Only one output terminal of the first comparator module 98 is utilized and this will be subsequently explained. A system power supply 100 is also energized by the main power switch 90 and supplies DC voltages to all of the modules (connections not shown). A reed relay module 102 is connected to receive a constant twelve-volt input signal from the system power supply 100.

The inital condition is that no inhibiting signals are supplied to the reed relay module 102 and the associated reed switch is thus closed to activate a static switch 104 to pass alternating current so as to energize a second pilot light 106 and to energize and close the solenoid valve 86 of the locking device 80 so as to prevent movement of the yoke 16. The second pilot light 106 indicates that the apparatus is in condition for the injection cycle.

One of the DC voltage outputs of the system power supply 100 is connected through switch 108, which is closed when power switch 90 is in the "Run" position to supply inhibiting signals to a pair of OR modules 112 and 114. Thus, OR modules 112 and 114 will be prevented from producing an output signal until the switch 108 is opened. The latter switch is mechanically connected to the main power switch 90 so as to be opened only in the "Off" and "Wash" positions, the latter to be subsequently explained. Hence, during the normal operating sequence, the OR modules 112 and 114 will not produce an output signal.

At the commencement of operation the operator closes an injection switch 116 which is connected between the switch 108 and the input side of an OR module 118. The OR module 118 will immediately produce an output signal which is directed as follows. The output is connected to the input side of the OR module 118 to "self hold" until an inhibiting signal is received. The output of OR module 118 is also connected to inhibit the reed relay 102, thereby causing its reed switch to open and deenergizing the static switch 104, with the result that the second pilot light 106 will be extinguished and the solenoid valve 86 on the locking device 80 will be deenergized and relaxed to permit the yoke 16 to be moved. The output signal from OR module 118 is also applied as an input signal to a reed relay 120 causing the reed switch to close and activate a static switch 122 which is connected to energize with alternating current, a solenoid valve 124 in fluid line 46, thereby delivering pressurized fluid to the power cylinder 18 to fully advance the yoke 16 (if not already fully advanced) and empty the measuring cylinders 12. The output signal from OR module 118 is also applied to a time delay module 128 which is adjusted to time out in a period sufficient to permit the full stroke of this apparatus. When the time delay module times out it delivers an output signal to inhibit the reed switch 120, thereby causing the static switch 122 to be opened and the solenoid valve 124 to be deenergized and disconnect the pressurized fluid through line 46. Finally, the output signal from OR module 118 is connected to a start switch 130. When the timer 128 has timed out and the solenoid 124 has been deenergized, the equipment is ready to commence the first injection cycle.

The normal injection sequence is begun when the first item is put on the weigh scale. The wiper of scale potentiometer 74 is moved to a position corresponding to the weight of the item such as a turkey and a corresponding voltage is thus applied to the comparator module 98. In this condition the comparator module 98 output signal is disconnected. The operator closes the start switch 130 and the continuing output signal from OR module 118 is connected through the start switch to an OR module 132, which immediately produces an output signal that is connected to "self hold." The operator may thus release the start switch 130 after it is momentarily closed.

The OR module 132 output signal is also connected as an input signal to an OR module 134. OR module 134 immediately produces an output signal which is connected to inhibit the OR module 118, thereby extinguishing its output signal and causing the time delay relay 128 to be reset. The output signal from OR module 134 also energizes a reed relay 136 which provides an output signal connected as an inhibitor on reed relay 102. Thus, the latter remains inhibited even though the earlier inhibiting signal from OR module 118 is extinguished. The reed switch of reed relay 136 is closed to activate a static switch 138 which, in turn, energizes and opens a solenoid valve 140 in fluid line 48, causing the power cylinder 18 to retract the yoke 16.

The yoke now begins to retract and immediately opens the limit switch 92 so as to extinguish the ready pilot light 94; and the additive liquid is drawn into the measuring cylinders 12. Movement of the yoke and rack 52 turns pinion 54 and moves the wiper on the comparison potentiometer 76 so as to increase that voltage signal to the comparator module 98. When the latter signal increases to the point that it equals the voltage signal from the scale potentiometer 74, the comparator module 98 flips its output signal to the other position which is connected to the inhibiting side of OR modules 132 and 134. Thus, the output signals of both OR modules 132 and 134 are extinguished, removing the input signal to reed switch 136. This reopens the associated reed switch and static switch 138 to de-energize the solenoid valve 140 so as to disconnect the pressurized fluid in line 48 to the power cylinder 18 and halting movement of the yoke 16.

Simultaneously, the output signal from reed relay 136 is terminated to remove the only remaining inhibiting signal from the reed relay 102, causing the latter to close its associated reed switch and the static switch 104 energizes and closes the solenoid valve 86 to lock the position of yoke 16. The pilot light 106 is also energized, signally that the apparatus is ready to inject the measured quantity of additive now contained in the cylinders 12. It is to be noted that when the output signal of comparator module 98 inhibits the OR module 134, the inhibiting signal to OR module 118 is also extinguished; but at that moment no input signal is present to energize the OR module 118.

The equipment is now in condition to inject the proper proportion of additive into the item on the weigh scale. The item such as a turkey is now removed from the scale and placed on the cradle 64 on work table 62. At this time the injection needles 26 are inserted in the flesh of the carcass and the injection switch 116 is then closed so as to place the direct current signal from the system power supply 100 on the input side of the OR module 118. The latter thus immediately produces an output signal, which is connected to "self hold." The output signal from OR module 118 is also applied to inhibit the reed relay 102, causing its associated reed switch to open, and the static switch 104 is again opened to deenergize solenoid 86 and unlock the yoke 16 for movement. The inject pilot light 106 is also extinguished.

The output signal of OR module 118 is also connected as an input to reed relay 120, closing the associated reed switch and static switch 122 so as to energize the solenoid valve 124 to admit pressurized fluid to power cylinder 18 to drive the yoke forwardly so as to completely empty the measuring cylinder 12. Thus, the measured quantity of the additive is forced into the item. When the yoke 16 reaches its maximum forward position the limit switch 92 is again closed and the ready pilot light 94 is energized, showing that the injection is complete and that the cycle may be repeated. At the same time the output signal voltage of OR module 118 is also available at the start switch 130.

When the time delay module 128, which is energized by the output signal of the OR module 118, times out the reed relay 120 will be inhibited, opening its associated reed switch and the static switch 122, causing the solenoid valve 124 to deenergize and disconnect pressure in line 46; and the apparatus is in the empty position and in condition to be refilled with a measured charge of additive in accordance with the weight of the next item to be placed on the scale 72.

The next item is now placed on the scale and the above novel operating sequence may be repeated.

At the end of a day's operation, or periodically during the day, the injection additive system should be flushed for sanitation purposes. To accomplish this, the operator connects a supply of flush fluid to the supply manifold 36. The 3-position power switch 90 is then turned to the "Wash" position, and the following will occur. The yoke 16 is fully forward and limit switch 92 is closed, energizing the ready pilot light 94. When the power switch 90 is in the "Wash" position, the mechanically coupled switch 108 will be open so that no inhibiting voltage signal is available to OR modules 112 and 114. At the same time the injection switch 116 has been effectively disconnected.

A second comparator module 150, which has 2 output positions, is connected separately with the OR modules 112 and 114. The second comparator module 150 is connected to a manually adjustable potentiometer 152 and to the comparison potentiometer 76. The first output position of the comparator 150 is connected to deliver the initial output signal as an input to OR module 114. The latter produces an output signal which energizes a second time delay module 154 which is effective to establish the time interval for reciprocation of the yoke 16. At a time interval determined by the adjustable setting of the time delay module 154 (preferably between about 3 and 40 seconds) an output signal will be produced by the time delay module 154, which is connected so as to inhibit OR module 118 so as to prevent energizing of the solenoid 124. At the same time the output signal from time delay module 154 also energizes reed relay 136, causing an output signal to inhibit the reed relay 102. As previously explained, when reed relay 102 is inhibited, the locking solenoid valve 86 is deenergized and the yoke 16 may be moved. Thus, since reed relay module 136 has been energized and its associated reed switch has been closed, the static switch 138 will also be closed and the solenoid valve 140 in pneumatic line 48 will be opened and the yoke 16 will be withdrawn so as to fill the measuring cylinders 12 with fluid from a supply of flush fluid, not shown, through supply line 42 and manifold 36. The yoke 16 will be withdrawn until the voltage signal from comparison potentiometer 76 equals the voltage output from the manually adjusted potentiometer 152. Preferably this is set so as to permit maximum movement of the yoke 16. When this occurs the output voltage from the comparator module 150 will flip from the first position to a second position, thus removing the input to OR module 114 and thereby extinguishing the output signal to time delay module 154. That timer resets and extinguishes the signal to reed relay 136 (and hence the inhibiting signal to reed relay 102). This causes the retraction of yoke 16 to stop and the solenoid valve 86 is actuated to lock the yoke in position. In addition the inhibiting signal applied to OR module 118 is extinguished, preparing it to function if an input signal is applied. The comparator module 150 now produces an output signal at the second position which is connected to the input of OR module 112. The latter immediately produces a signal that is applied to the input side of OR module 118, which now produces an output signal which, as explained before, unlocks the yoke 16 and causes it to be moved to the empty position (through inhibition of reed relay module 102 and actuation of reed relay 120).

As the yoke 16 moves forward to expel the flush liquid from the measuring cylinders 12 the signal from the potentiometer 76 will be reduced. When the voltage signal reduces sufficiently the output from the comparator module 150 will flip back to the first position so as to extinguish the OR module 112 and to activate OR module 114 to energize the time delay module 154. Thus the cycle for washing will automatically repeat and continue to reciprocate the yoke 16 until the main power switch 90 is turned to the "off" position.

Obviously many modifications and variations of the invention as hereinbefore set forth may be made without departing from the spirit and scope thereof, and, therefore, only such limitations should be imposed as are indicated in the appended claims.

I claim:

1. An improved method for dispensing selected measured quantities of a liquid material for injection into a food item, said method comprising: filling the liquid material into a metering means; arresting said filling when the quantity of liquid in the metering means reaches a percentage of the weight of said food item; locking said metering means against further filling; connecting said metering means to the food item to be injected; unlocking said metering means; and fully emptying said metering means.

2. An improved method for dispensing selected measured quantities of a liquid material for injection into a food item, said method comprising; filling the liquid material into a measuring cylinder by withdrawing a piston therein; arresting said piston when the quantity of liquid in the measuring cylinder reaches a percentage of the weight of said food item; locking said piston against further movement; connecting said measuring cylinder to the food item to be injected; unlocking said piston; and advancing said piston in said measuring cylinder to fully empty same.

3. The method of claim 2 wherein a signal is produced by a weighing scale according to the weight of said food item; and a second signal is produced according to the movement of said piston and said signals are compared to determine when the selected quantity of liquid has been filled into said measuring cylinder.

References Cited

UNITED STATES PATENTS

| 3,232,209 | 2/1966 | Earl et al. | 99—107 X |
| 3,386,369 | 6/1968 | Vogt | 99—532 |
| 3,556,808 | 1/1971 | Panek | 99—107 |
| 3,718,083 | 2/1973 | Walters | 99—532 |

HYMAN LORD, Primary Examiner

U.S. Cl. X.R.

426—262, 266